US005790768A

United States Patent [19]

Windel et al.

[11] Patent Number: 5,790,768

[45] **Date of Patent: *Aug. 4, 1998**

[54] PROCESS AND CONFIGURATION FOR AN INTERNAL COST ACCOUNTING PRINTOUT

[75] Inventors: Harald Windel; Wolfgang Thiel; Klaus Dietrich; Stephan Günther; Norbert Knoth; Erwin Simon, all of Berlin, Germany

[73] Assignee: Francotyp-Postalia AG & Co., Birkenwerder, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 704,355

[22] Filed: Aug. 28, 1996

Related U.S. Application Data

[63] Continuation of Ser. No. 97,159, Jul. 26, 1993, abandoned.

[30] Foreign Application Priority Data

Jul. 24, 1992 [DE] Germany .......................... 42 24 955.4

[51] Int. Cl.$^6$ .................................................. G06F 15/00

[52] U.S. Cl. .............................................. 395/117; 395/101

[58] Field of Search .................................... 395/117, 101, 395/110, 114, 115, 116, 111

[56] References Cited

U.S. PATENT DOCUMENTS

| | | | |
|---|---|---|---|
| 4,312,045 | 1/1982 | Jean et al. . | |
| 4,611,232 | 9/1986 | Searby . | |
| 4,724,759 | 2/1988 | Gilham et al. | 101/91 |
| 4,868,757 | 9/1989 | Gil . | |
| 4,947,344 | 8/1990 | Hayashi et al. | 364/518 |
| 4,958,291 | 9/1990 | Mamone et al. | 364/464 |
| 4,962,459 | 10/1990 | Mallozzi et al. | 364/464.02 |
| 4,992,959 | 2/1991 | Hamada et al. | 364/519 |
| 5,012,436 | 4/1991 | Zietlow et al. . | |
| 5,038,153 | 8/1991 | Liechti et al. . | |
| 5,075,862 | 12/1991 | Doeberl et al. | 395/117 |
| 5,111,030 | 5/1992 | Brasington et al. . | |
| 5,233,657 | 8/1993 | Günther . | |

(List continued on next page.)

FOREIGN PATENT DOCUMENTS

| | | |
|---|---|---|
| 0137147 | 4/1985 | European Pat. Off. . |
| 0179292 | 4/1986 | European Pat. Off. . |
| 0247622 | 12/1987 | European Pat. Off. . |
| 0493948 | 7/1992 | European Pat. Off. . |
| 2948155 | 6/1980 | German Dem. Rep. . |
| 39 03 718 | 8/1989 | German Dem. Rep. . |
| 35 18 539 | 5/1990 | Germany . |
| 40 18 166 | 12/1991 | Germany . |
| 40 34 292 | 4/1992 | Germany . |
| 2173742 | 10/1986 | United Kingdom . |
| 2235413 | 3/1991 | United Kingdom . |

*Primary Examiner*—Raymond J. Bayerl
*Assistant Examiner*—Steven P. Sax
*Attorney, Agent, or Firm*—Herbert L. Lerner; Laurence A. Greenberg

[57] ABSTRACT

A postage meter module has a printing unit, a control unit connected to the printing unit, input/output devices connected to the control unit, and memory devices connected to the control unit. A configuration for an internal cost center printout includes a pixel memory having a field and at least one memory area for accounting data into which data are loaded and converted and/or from which data are read out and converted. The conversion is a blockwise orthogonal rotation of the pixel memory field. A device for orthogonal rotation of the pixel memory field permits a block of a print image with accounting data having been electronically rotated by 90° or by 270° in a direction of printing to be temporarily stored in or read out from the at least one memory area of the pixel memory. A print control unit reads out print image data corresponding to the accounting data by blocks from the pixel memory. A process for an internal cost center printout with a printing device for printing out variable information, includes switching over operation of a print head from printing postage for postal matter to printing a cost center printout.

30 Claims, 5 Drawing Sheets

U.S. PATENT DOCUMENTS

| | | | |
|---|---|---|---|
| 5,241,626 | 8/1993 | Taoda | 395/164 |
| 5,243,691 | 9/1993 | Kuwabara et al. | 395/112 |
| 5,257,197 | 10/1993 | Günther et al. . | |
| 5,276,742 | 1/1994 | Dasari et al. | 395/137 |
| 5,278,947 | 1/1994 | Balga, Jr. et al. | 395/111 |
| 5,295,245 | 3/1994 | Alcorn et al. | 395/164 |
| 5,301,036 | 4/1994 | Barrett et al. | 358/448 |
| 5,343,556 | 8/1994 | Silverberg | 395/111 |
| 5,408,416 | 4/1995 | Gilham | 364/464 |

PROCESS AND CONFIGURATION FOR AN INTERNAL COST ACCOUNTING PRINTOUT

This application is a continuation of application Ser. No. 08/097,159, filed on Jul. 26, 1993, now abandoned.

BACKGROUND OF THE INVENTION

FIELD OF THE INVENTION

The invention relates to a process and a configuration for an internal cost center or accounting department printout by means of a postage meter module that has a printing unit and a control unit connected to input/output devices and memory devices.

Statistics regarding the postage volume processed by postage meter machines are compiled for the purpose of accounting with regard to postal fees. Since the postage meter module prints out a value, there is a demand for security with regard to the printout as well as the accounting. Normally, the statistics compiled by the postal fee accounting system are printed out on a separate external printer.

For example, German Published, Non-Prosecuted Application DE 40 18 166 A1, corresponding to allowed U.S. application Ser. No. 07/709,653, filed Jun. 3, 1991, discloses a postage meter module that is disposed in a slot of a slide-in hard drive of a personal computer and has a printer for self-sticking postage strips. In addition, there have also been proposals for printing out addresses with the postage meter printer, but another external printer connected to a personal computer is necessary in order to print out the accounting data as in the past.

There have already been proposals for using the existing printing equipment of a communications terminal (fax device) for the postage printout (such as in German Published, Non-Prosecuted Application DE 40 34 292 A1, corresponding to allowed U.S. application Ser. No. 07/782,566, filed Oct. 25, 1991), but that type of printer is not equipped for printing out accounting data.

German Published, Non-Prosecuted Application DE 39 03 718 discloses a postal fee accounting system for postage meter machines that can be operated and used by several people or several departments by way of their own IC cards, in which case the individual cards are assigned to the people or department in the accounting process. The information stored in the card can be read out by using a personal computer and then at the end of an accounting period, a summary of the use of the postage meter machine during the given accounting period can be obtained. The use of the postage meter machine for each user (holder of an IC card) can then be displayed and printed out. The need for a separate personal computer with its own printer in order to obtain a written list of the use per cost center is a disadvantage of that method. Another disadvantage is that such a printout can easily be simulated with any computer system. Therefore, there is no security to protect the printout of the accounting data from unwanted manipulation.

SUMMARY OF THE INVENTION

It is accordingly an object of the invention to provide a process and a configuration for an internal cost accounting printout, which overcomes the hereinafore-mentioned disadvantages of the heretofore-known devices and methods of this general type and which permit a printout for each of the cost centers in an inexpensive and simple manner. The printouts for the internal cost center accounting should differ from those of the postage meter machine from the beginning.

With the foregoing and other objects in view there is provided, in accordance with the invention, in a postage meter module having a printing unit, a control unit connected to the printing unit, input/output devices connected to the control unit, and memory devices connected to the control unit, a configuration for an internal cost center printout, comprising a pixel memory having a field and at least one memory area for accounting data into which data are loaded and converted and/or from which data are read out and converted, the conversion being a blockwise orthogonal rotation of the pixel memory field; a device for orthogonal rotation of the pixel memory field, to permit a block of a print image with accounting data having been electronically rotated by 90° or by 270° in a direction of printing, to be temporarily stored in or read out from the at least one memory area of the pixel memory; and a print control unit for reading out print image data corresponding to the accounting data by blocks from the pixel memory.

With the objects of the invention in view, there is also provided a process for an internal cost center printout with a printing device for printing out variable information, which comprises switching over operation of a print head from printing postage for postal matter to printing a cost center printout.

The invention is based on the idea that under the assumption that such a printing device is used for prepayment of postage for postal items and can print out variable information by means of the print head, a printout for each of the cost centers is also made possible with the print head of the postage meter machine which is normally used only for the postage for letters. To accomplish this, a user dialog and a switchover in the control unit of the postage meter machine are implemented, and the accounting data stored in a cost center memory is no longer output by way of an input/output interface but instead is output directly through the print head of the postage meter machine. The accounting data that are of interest are summarized by the control unit in conjunction with the input/output devices, entered into a working memory, decompressed, processed and converted into graphics pixels and stored temporarily in a pixel memory.

The postage area on letters preferably has a width of about 2.5 to 3.5 cm. The invention is based especially on the assumption that a postage meter print head being formed of a single print strip can be used for the postage printout and for the internal cost center accounting. The internal cost center printout takes place on an area with a width of approximately 2.5 to 3.5 cm and a length of approximately 14 to 21 cm.

The postage meter module permits a display of at least three groups of information each requiring several lines at the same time in one display before the internal cost center printout which appears especially on a strip. The first information group of each strip contains identification data, security data and other information.

The identification data may include, for example, the current date, a running number for internal cost center printouts and a strip number. In order to provide security against forgery, security data are also generated, stored temporarily in a memory area of the working memory and displayed as a cryptographic number. The informational data concern a brief notice regarding the order and organization of the list in the subsequent information groups.

The last information group contains the total of the accounting data regarding the selected information groups listed according to a stipulated order.

The middle information groups contain the actual accounting data. The information groups are uniformly distributed on blocks that can be observed and checked in the display before being printed out. There is a clear presentation in the form of "what you see is what you get" (WYSIWYG) in the display for each block. If the number of information groups per block is x≦2 and the number of blocks per strip is k≦2 and the size of a display window is sufficient to display all of the blocks of a strip, then the following equation holds for the maximum number of information groups that are assigned to cost centers and can be displayed:

$$m_A=y^*\{(x^*k)-1\}-1, \text{ where } y=1 \quad (1)$$

When the number of cost centers defined by the size of the display window is $m_A$, the total cost center data are displayed in the last block at the end of the list. If the number of cost centers is greater than $m_A$ and the printout might have to be printed on several strips (y>1) of a constant length, then scrolling appears first in the display. At the end of the list in the last block or at the end of the last strip, the totals for the cost centers are again displayed.

The cost centers are shown in the display divided into at least two blocks side by side. In the printout the blocks are preferably disposed one beneath the other. For this purpose the direction of printing is rotated electronically per block in such a way that the columns appear as lines and the lines appear as columns.

In order for the printouts for the internal cost center accounting to differ from those of the postage meter machine from the beginning, a 270° rotation is also provided in addition to the 90° rotation.

The invention takes into account the idea that for a print strip width of $b_p$=2.5 to 3.5 cm, only a few lines with a few alphanumeric characters per line can be printed. In order to permit a printout with the lines rotated by 90°, an additional control unit that rotates the alignment of the standard print of a block electronically by 90° is also provided for the print strip of the print head. Since the line length is limited, the blocks are turned individually. This rotation is performed according to this invention in a block with the dimensions $b_p$*$b_p$, for example.

The process for an internal cost center printout by means of a postage meter module is also characterized by the provision that blocks rotated orthogonally in different ways are stored temporarily in the memory areas of the pixel memory. It is assumed that after another switching operation in the control unit, the blockwise orthogonal rotation is performed by means of additional hardware and/or software in the control unit.

The process for an internal cost center printout by means of a postage meter module is also based on the assumption that a corresponding switchover is performed in the print control unit so that the printout will differ in the direction of printing of the lines from that of the postage meter printout. The invention can be used to advantage with printing processes wherein the print head remains motionless.

In order to prevent the printout of cost centers that do not show any recent activity, only the information for cost centers where there has been some activity is printed out. This prevents wasting paper strips. It is also advantageous that a process has been created for a cost center printout which is secure from forgery.

Other features which are considered as characteristic for the invention are set forth in the appended claims.

Although the invention is illustrated and described herein as embodied in a process and a configuration for an internal cost accounting printout, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
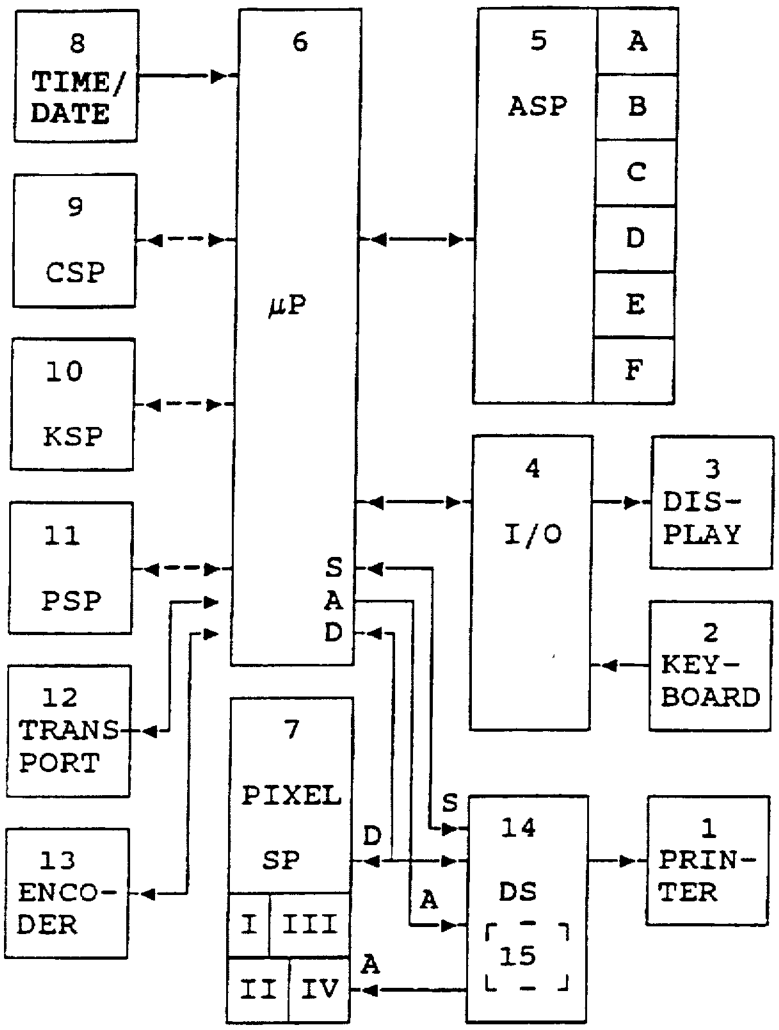
FIG. 1 is a block circuit diagram of a configuration according to the invention in a postage meter machine.

Referring now to the figures of the drawing in detail and first, particularly, to FIG. 1 thereof, there is seen a block circuit diagram of a configuration according to the invention in a postage meter machine with input/output devices 2, 3, 4, memory devices 5 (ASP), 7 (SP), 8 (TIME/DATE), 9 (CSP), 10 (KSP), 11 (PSP), a control unit 6 which is preferably equipped with a microprocessor (μP), a print control unit (DS) 14, a print unit 1 with a feed unit 12 (TRANSPORT) which has a drive and preferably contains a strip feed with a strip release, and an encoder 13.

The input/output devices include both the internal and/or external operating devices shown herein as well as others that are not shown (such as a chip card, a remote feed, PC operating devices, etc.) for the postage meter module.

The encoder 13 of the strip feed unit 12 with the strip release and a pixel memory 7 with several separate memory areas or regions I, II, III and IV are connected to the control unit 6 which is in turn connected to the input/output devices 2, 3, 4 and the memory devices 5, 8, 9, 10 and 11.

In posting or applying postage to mail, the print control unit 14 reads data out of the pixel memory 7 while the print unit 1 is controlled by means of a switch unit (SE) (KEYBOARD) that is provided in the print control unit 14 but is not shown in FIG. 1. Such a switch unit can be connected to a controllable power source, as is proposed, for example, in German Published, Non-Prosecuted Application DE 42 14 545 A1, corresponding to U.S. application Ser. No. 08/054,887, filed Apr. 29, 1993, for an ETR printing process.

In an advantageous manner, the present process is based on the fact that a printing device 1 of a postage meter module can be used for an internal cost center or accounting department printout.

Upon first switching to the internal cost accounting printout in the control unit 6, the postage meter mode is blocked. The cost accounting printout is performed with the same print unit 1, although the direction of printing of the lines in the printout differs significantly from that of a postage meter printout, in addition to the difference in content.

As a result of the switching operation, the accounting data stored in a cost center memory (KSP) 10 are compiled by the control unit 6 in conjunction with the input/output devices 2, 3 and 4, they are entered into a working memory (ASP) 5, decompressed, processed and converted into graphics pixels and stored temporarily by blocks in the pixel memory (SP) 7.

The process for an internal cost center printout by means of a postage meter module is based on the fact that a print image which is in the form of k blocks is rotated by blocks in terms of the printing direction in such a way that the lines are converted to columns and vice versa, in which case k blocks contain accounting data for m cost centers and the first block of a print image also has an identification and the last block of a print image has a summation of the accounting data.

A user dialogue which takes place before printing is provided under the following conditions and data processing with the contents given below takes place before the internal cost center printout:

a) Blocking the postage meter mode and instructions for the user in the display that now there will not be a postage meter function but instead an internal cost center printout will appear. A request for an entry and the user's authorization will also appear. The maximum number of cost centers per printout is calculated according to the entry of the dimensions of the carrier of the printout (strip length). Only the accounting data regarding the cost centers that have been used will appear.

b) A certain number of cost center data to be printed out will be selected by the user, preferably an area of KST 1 to KST X. Totals are formed, identification is established and the information is divided into blocks under the following premises:

Each printout is numbered. The date and number of the printout and the strip number followed by a cryptographic number appear at the beginning of each cost center printout.

The list of cost centers according to increasing numbers begins with cost center number 1 or with the number of the first cost center being used and contains the information on the respective number of uses of the postage meter machine, in other words the number of items printed under this cost center, and the information regarding the total amount of postage used so far by that cost center.

The totals formed for the number of items and the total amount of postage used on the basis of the data for all of the selected cost centers appear at the end of the cost center printout.

c) Blocks that appear side by side are shown in the display with the possibility of scrolling forward and backward.

d) Electronic rotation of pixel memory fields by blocks, release of a first strip by the strip feed and printout by columns.

According to the invention, a device 15 is provided in the print control unit 14 for orthogonal rotation of the pixel memory field and there is at least one memory area for accounting data in the pixel memory 7, into which data are entered and converted and/or from which data are read out and converted. A print image in the form of k blocks is rotated by blocks with regard to the direction of printing in such a way that the lines become columns and vice versa, in which case k blocks contain accounting data for cost centers, the first block of a given print image also contains an identification and the last block of a print image contains a summation of the accounting data.

According to the invention, it is also provided that the pixel memory 7 contains several separate memory areas from which the print control unit 14 reads out the accounting data.

In one embodiment of the invention the strips of an automatic strip feed are used as the printing medium. Since these strips are 165 mm long but only about 35 to 40 mm wide, the accounting statistics must be reduced to a uniform line length of 2.5 cm with 192 dots or 3.5 cm with 256 dots. one possibility of accomplishing this is to reduce the print image by means of computer transformation for a print strip of 25.4 mm. Another advantageous option is to use a set of characters of a suitable size that are already present in a character memory (CSP) 9 but were previously intended only for printing the machine number of the postage meter machine, in which case the set of characters may optionally have to be increased or supplemented.

Figure 2:
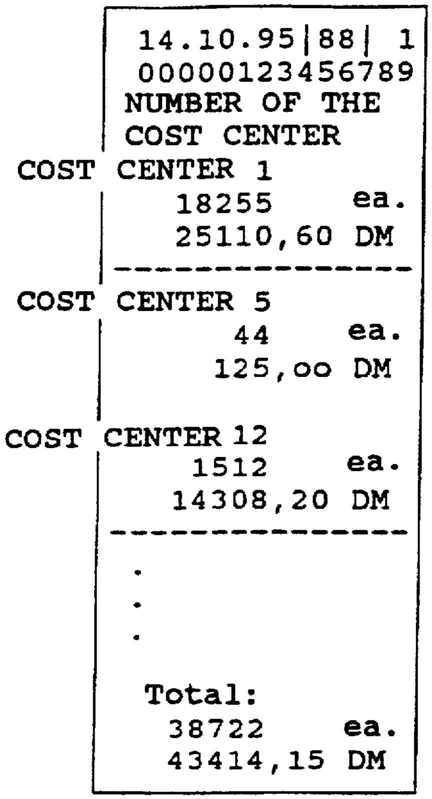
FIG. 2 is a top-plan view of a cost center printout produced by means of the postage meter module.

FIG. 2 shows one possible embodiment of an internal cost center printout in three square blocks on a postage meter strip which is shown with three cost centers for the sake of simplicity. The accounting data for each cost center form one information group. The sequence in the internal cost center printout is stipulated in a user dialogue before the printout, either according to the number of the cost center being used, in order of increasing numbers, or according to the frequency of use or according to cost burden in order of decreasing amounts. The list of information groups having cost center data according to the stipulated order can be verified in a display 3. The display or printout is in square blocks, wherein each block contains at least one information group. Additional variants of one order can be compiled and shown in the display 3 before printout.

The third line of the first information group of the first block of the cost center printout (shown in FIG. 2) contains information that is selected for a list of the information groups containing cost center data which is selected in this case as a stipulated order "NUMBER OF THE COST CENTER." This means that the order is based on the number of the cost centers used in order of increasing numbers. The second information group of the first block shows that each list begins with the cost center number, the line beneath that shows the information regarding the corresponding number of uses of the postage meter machine, in other words, the number of items printed under this cost center, and beneath this the information regarding the total postage amount consumed so far by that cost center appears.

The number of blocks per recording medium depends on the dimensions of the recording medium and must thus be entered previously into the postage meter module, which then automatically determines the maximum possible number of blocks per recording medium and controls the supply of recording medium, for example by controlling the strip feed. For example, a space of k=6 blocks is obtained for y=1 postage meter strips each with a length of 15 cm and a width of 2.5 cm, in other words with 192 dots in the print strip where $b_p$=2.5 cm. With x=2 information groups per block, the total number of information groups is thus 12. The first information group again contains identification data, a cryptographic number and other information in an information group. However, the number of cost centers is determined by the formula given in equation (1): $m_A=y*\{(x*k)-1\}-1=10$. Thus, space still remains in the last information group of the last block to show the totals for the cost center data at the end of the list.

A different distribution of information groups on the blocks is equally possible. For example, it is possible to stipulate in requesting the entry that a list be compiled within one cost center according to the selected printout (airmail, book rate, etc.).

Figure 3:
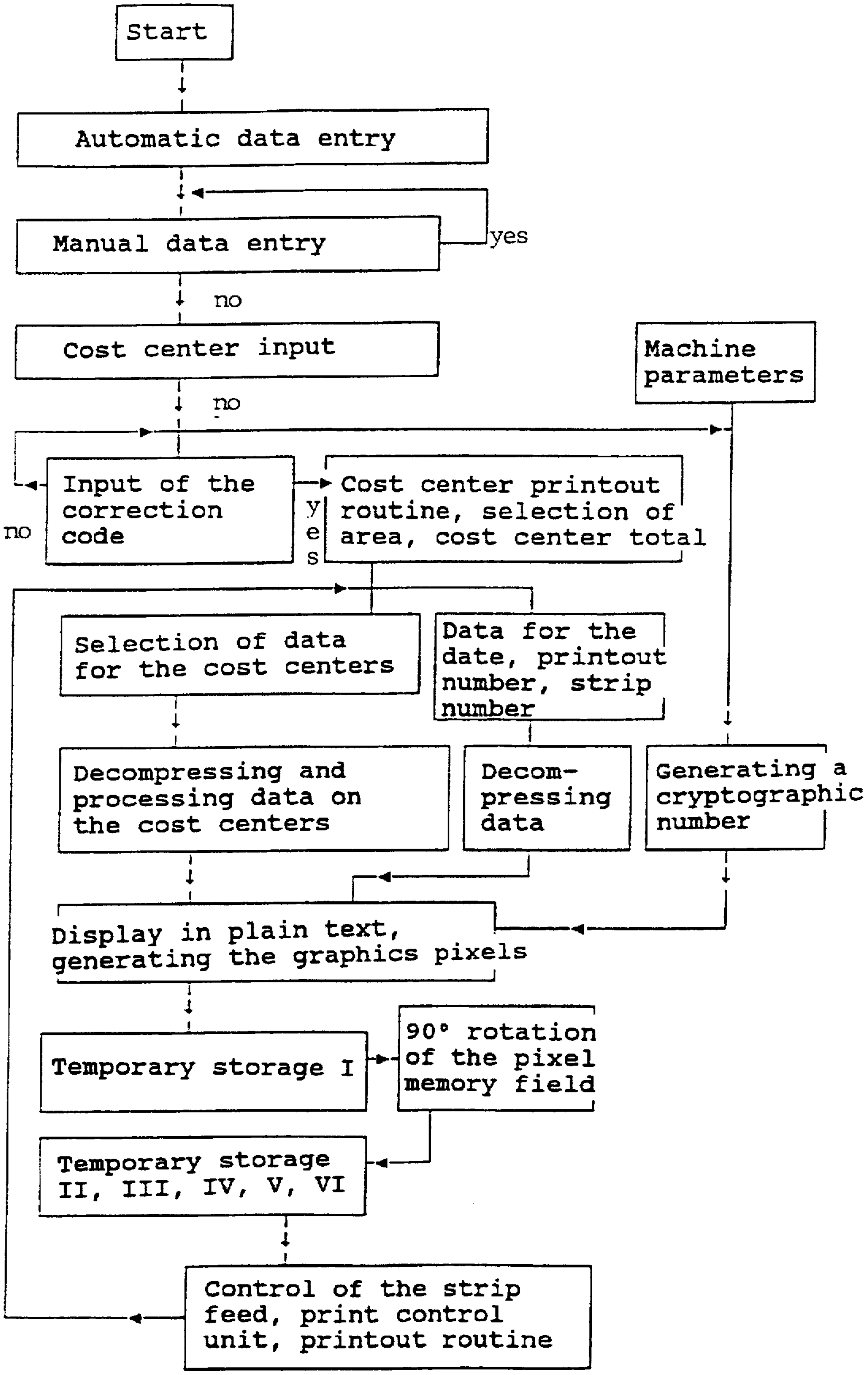
FIG. 3 is a flow chart for an internal cost center printout.

Starting from an automatic and/or manual data entry, the flow chart shown in FIG. 3 for an internal cost center printout begins with entry of the number of the cost center and entry of the correction code. The user dialogue includes a special authorization procedure for certain cost centers that require a higher level of security, and access to this cost center information is limited to a certain group of people. In a cost center routine, a data entry request is provided for the specific position in the order of the cost center printouts and for the order in the list within a printout for each cost center. Furthermore, information groups are to be formed automatically.

In the cost center printout routine, the processor seeks all cost centers for which the postage meter machine has been used, reads the data out of the cost center memory and stores the data in a memory area or region A of the working memory 5, such as in BCD-coded form. At the same time, the user is asked about the area of cost centers which is also stored in the area A of the working memory 5 in BCD-coded form. The processor in the control unit 6 forms the sum of the cost center data assigned to this area and stores the data in a memory area B of working memory 5. The processor also forms the identification data which includes the current date, a running number for internal cost center printouts and a strip number and stores this information in a memory area C of the working memory 5. It encodes these data together with a machine parameter (number of the postage meter module) to yield a cryptographic number which it stores in a memory area D of the working memory 5. Each of these cryptographic numbers has a character code in the character memory 9.

Then the strip length or the dimensions of the recording medium are entered by the user on request. The identification data appear at the beginning of a single postage meter strip, the summation totals appear at the end of the postage meter strip and the information regarding the cost centers appears in the middle, so the processor sorts the data and makes an assignment according to the number of the cost center and then stores this information in another memory area E. In doing so, the processor takes into account the length of the strip and optionally the required division among several strips in which case the identification data and data for the maximum number of cost centers on the first to the next-to-last strip are taken into account, and the totals that are formed in accordance with the number of cost centers on the last strip are also taken into account.

Before the internal cost center printout, the postage meter module permits a display of the identification data, the accounting data for several cost centers and the totals by means of the display 3, wherein this information may be divided into three blocks side by side, for example. In order to do so, a memory area F of the working memory 5 is used.

If the number of cost centers is larger than can be displayed in the display and would have to be printed out on several strips of a constant length, then scrolling is first shown in the display. At the end of the list in the last block or at the end of the last strip, the total for the cost center data is also displayed. There is a plain display in the form of "what you see is what you get" (WYSIWYG) for each block.

After selecting the area of the cost centers, the data which are in BCD-coded form for the identification and for the cryptographic number as well as for the first of the cost centers are read out of the working memory 5, decompressed and converted to a first print image with the help of the character memory 9 (on the command "cost center display" triggered by a first key of the operating unit 2).

This first print image contains, for example, the information on three cost centers, as is shown in FIG. 2, and is displayed first in the display unit 3 of the postage meter module, in which case the identification number, the cryptographic number, that information regarding the order and the three types of cost center information as well as the total information, appear in three blocks side by side. Preferably all alphanumeric characters are stored in pixels in the character memory 9 in the manner in which they are used for the normal printout and for the display (size and direction).

If the display area is fixed, the pixel memory 7 receives from the control unit 6 the print image data that can be displayed in the display device 3 in the printing direction in a first block. This block is stored temporarily in the first area I of the pixel memory 7.

The print image data are transferred from an output logic unit of the control unit 6 which is realized in the form of hardware and/or software, to the pixel memory 7, from which the print pixel data are normally also supplied by columns to the print head by way of the print control unit 14 in the process of printing postage. However, the postage meter option is blocked in this mode and a switchover is effective.

On the basis of the block diagram illustrated in FIG. 1, a first variant of a switch operation will be discussed below in detail. The pixel memory 7 is provided with the separate memory areas I, II, III and IV from which the print control unit 14 reads out print image data, especially print image data containing accounting data. The pixel memory 7 is connected to control unit 6 and the pixel memory 7 receives the accounting data that can be displayed in the printing direction in the output device 3 in the form of a print image block by block.

Addresses A supplied by the control unit 6 include area addresses $A_B$ for selection of a memory area I, II, III or IV for input of a block and low addresses for addressing within a block. In the device 15 for rotation of the pixel memory field, the low addresses are converted by reading in.

In another variant, the low addresses are converted by readout of a block in the device 15 for rotation of the pixel memory field. In other words when the print control unit 14 forms print image data, especially print image data that contain accounting data, the low addresses are read out by blocks.

In another variant, the pixel memory 7 contains several separate memory areas II, III and IV, from which the blocks that have been rotated orthogonally are read out. Each block of a print image, especially with accounting data, is first stored temporarily in the first area I of the pixel memory 7 and is converted by the device 15 for orthogonal rotation of the pixel memory field and transmitted to at least one second area II of the pixel memory 7. At least one block of a print image that has been rotated electronically by 90° or by 270° in the direction of printing is stored temporarily with accounting data in the second area II of the pixel memory 7 before printout. On the command "cost center printout" given by a key of the operating unit 2, the print image data of the first block are read out from the first area I of the pixel memory 7.

In order to generate a print image that has been rotated by 90° in the direction of printing together with the accounting data, a switchover to a device that performs a 90° rotation of the pixel memory field is performed in the control unit 6 in another variant. Addresses A are relayed through the print control unit 14 but are not converted. The rotated print image is stored temporarily in a second area II of the pixel memory 7 before printout. The print control unit 14 is connected to the second area II of the pixel memory 7 for printout over lines with data D. Then a strip is released by the strip feed.

The strip is transported to the print head, and the encoder 13 delivers a position report of the strip in relation to the print head. Depending on this position report, the print image data are read out by print columns from the second area II of the pixel memory 7 and are input serially in a known manner into the serial-parallel shift register of the switch unit SE, stored temporarily in latches and printed out during a STROBE pulse by means of the print head of the print unit 1.

In the print pauses, the second block is stored temporarily in the first area I of the pixel memory 7 either entirely or in parts in successive pauses and sent to t he device for rotating the pixel memory field by 90°. Then the block of the print image with the accounting data rotated by 90° in the print direction is stored temporarily in the third area III of the pixel memory 7 before printout. The 90° rotation and storage of the third block in the fourth memory area IV take place in the same way.

The control unit 6 is therefore also connected to the print control unit 14 in order to verify whether or not printing is concluded. A corresponding check also takes place according to the software. A control for a strip feed is provided for strips of variable length or for strips of a constant length. If one strip is not sufficient to print out all of the cost centers, then another strip is requested of the strip feed and then printed out by control unit 6. The strips are numbered according to their order. An identification code for each strip is provided for this purpose.

Instead of the strips, envelopes or pages in DIN A5 format or DIN A6 format may of course also be used. In this case the envelopes or pages are supplied by an automatic feed unit and printed with the cost centers. However, an interactive operation with the user by way of the display is also possible. In this case, the user must manually insert paper in response to the display: "Please insert paper".

The recording medium, which preferably is formed of paper, can be printed several times under some circumstances by inserting the sheet of paper again after rotating or by means of corresponding mechanical measures (changing the edge of the page), electronic rotation of the print device by 270° C. in comparison with the standard print direction of lines and recall of columns from the pixel memory 7 which starts with th e last column.

Figure 4:
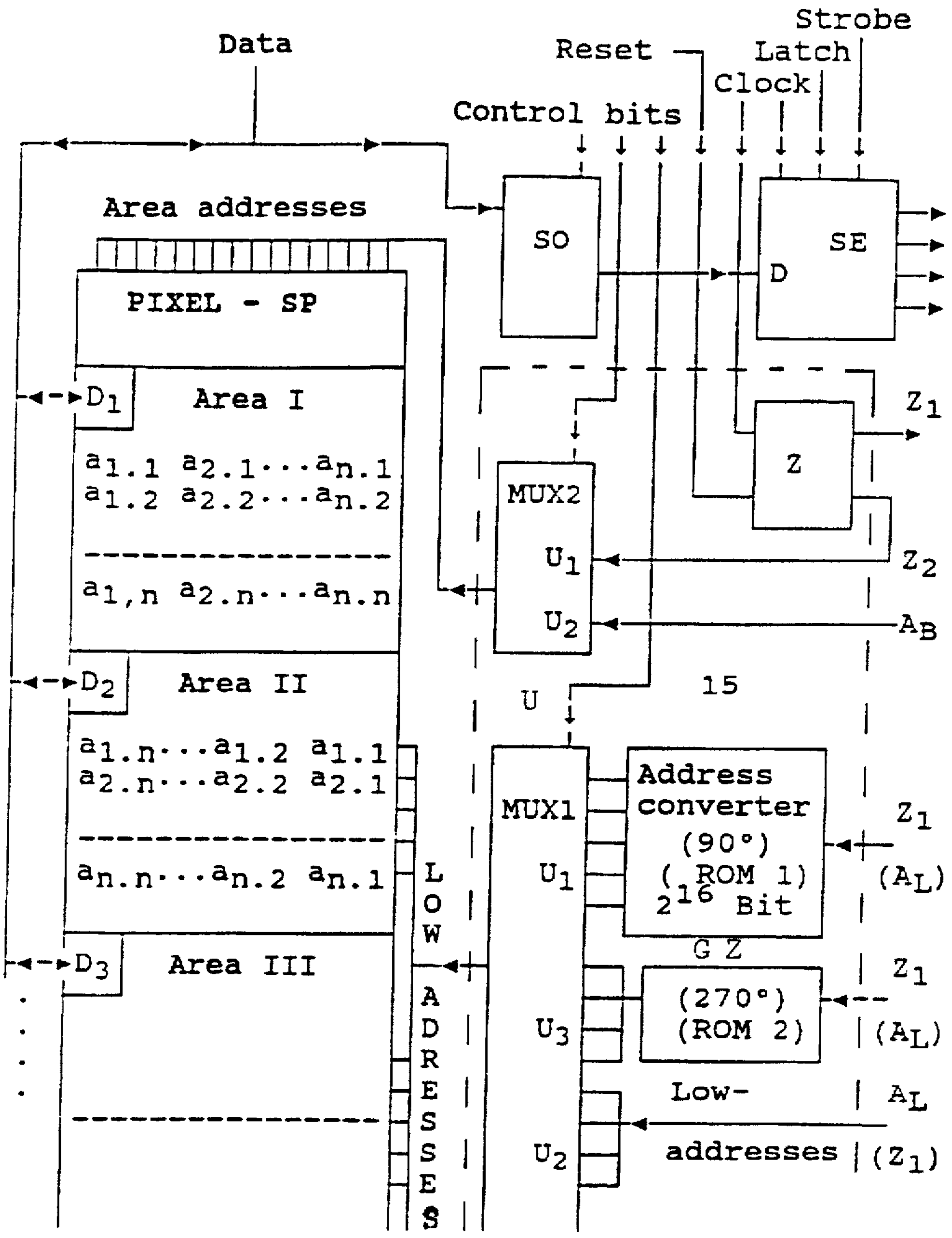
FIG. 4 is a block circuit diagram of an orthogonal rotation of a pixel memory field.

FIG. 4 shows a circuit that is disposed in the print control unit 14 and is connected to the address inputs of the pixel memory 7 for the device 15 for orthogonal rotation of the pixel memory fields. This device 15 includes an electronic switch U and a device G for generating addresses. The electronic switch contains first and second multiplexers MUX1 and MUX2, and the device G for generating addresses contains a counter module Z with a first counter and a second counter and read-only memories ROM1 and ROM2 for converting the addresses individually. Each multiplexer MUX1, MUX2 includes several tri-state buffers and is controlled by a state machine SM (not shown in FIG. 4) of the print control unit 14. When the data are read in, the first multiplexer MUX1 for the low addresses $A_L$ is switched to inputs $U_2$, so the pixel memory 7 can be addressed normally by the control unit 6. In this case, one of the memory areas with area addresses $A_B$ is addressed by way of the inputs $U_2$ of the second multiplexer MUX2.

In order to read out the data (after conversion) from a memory area of the pixel memory 7, the low addresses $A_L$ for internal addressing of the data of each block are generated by way of a first counter with outputs $Z_1$, and the area addresses $A_B$ for addressing the memory areas are generated by a second counter with the outputs $Z_2$. The multiplexers are switched and the outputs $Z_2$ are applied by way of inputs $U_1$ of the second multiplexer MUX2 to the area address inputs of the pixel memory 7. If the outputs $Z_1$ of the first counter are applied to a 90° address converter (ROM1) having outputs which are connected to the inputs $U_1$ of the first multiplexer MUX1, then low addresses for the pixel memory 7 that cause a 90° rotation of the pixel memory field are formed.

If the outputs $Z_1$ of the first counter are applied to a 270° address converter (ROM2) having outputs which are connected to the inputs $U_3$ of the first multiplexer MUX1, then low addresses for the pixel memory 7 that cause a 270° rotation of the pixel memory field are formed.

If, on the other hand, the outputs $Z_1$ of the first counter are not applied to any address converter or are applied to a 180° address converter (in a non-illustrated manner), then low addresses that cause a 0° or 180° rotation of the pixel memory field are supplied to the pixel memory 7 by way of the multiplexer.

In another variant, the circuit 15 for the orthogonal rotation of the pixel memory field is connected to the pixel memory 7 in order to input at least one block of a print image with accounting data into at least one second area II of the pixel memory 7 after an electronic rotation by 90° or 270° in the direction of printing. In the case of input with conversion, the lines for the area addresses $A_B$ supplied by the control unit 6 are connected by way of the inputs $U_2$ of the second multiplexer MUX2 to the area address inputs of the pixel memory 7, but the lines for the low addresses $A_L$ supplied by the control unit 6 are connected by way of an address converter ROM1 or ROM2 and the inputs $U_1$ and $U_3$ of the first multiplexer MUX1 to the low address inputs of the pixel memory 7.

In the case of readout of the converted data, the print control unit 14 is connected by way of the data line to the second area II of the pixel memory 7 and to the control unit 6. The outputs $Z_2$ of the second counter are again connected by way of the inputs $U_1$ of the second multiplexer MUX2 to the area address inputs of the pixel memory 7. The outputs $Z_1$ of the first counter are connected by way of the inputs $U_2$ directly to the low address inputs of the pixel memory 7, so that print control unit 14 receives the accounting data that can be displayed in the display device 3 in the print direction as orthogonally rotated blocks of a print image in a normal print data output.

Another possibility includes a combination of the aforementioned variants. For an internal cost center printout, data are normally read into the first area I of the pixel memory 7. In the print pause before the strobe pulse, a switch to rotation of the pixel memory field is performed in the print control unit 14. The data are thus not stored directly in an SP shift register of switch unit SE, as is also the case in the use of the device as a postage meter machine, but are loaded only in a readdressed form into a second memory area II of the pixel memory 7.

The addresses generated in the device G for generating address fields serve to enter the data by way of the data lines into the second memory area II of the pixel memory 7 with the intended rotation. As is shown and described especially from the discussion of the memory areas I and II in FIG. 4, the line data then become column data.

The device G for generating address fields is integrated into the print control unit 14 in the variant shown herein and is implemented in the form of hardware. A counter that receives clock pulses generates a counter status that is converted to an address by a ROM. For each bit addressed by the control unit 6 and appearing with the clock pulse on a data line D, a new address then appears at the ROM output.

In another variant, this generation of address fields is implemented by the control unit 6 by means of software. Only the state machine, a circuit SO for serial output and the switch unit SE are then necessary in the print control unit 14.

Figure 5A:
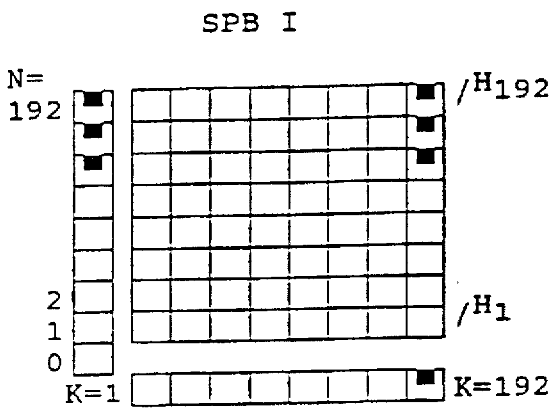
FIG. 5*a* is a diagram of a memory area I before a 90° rotation of the pixel memory field.
Figure 5B:
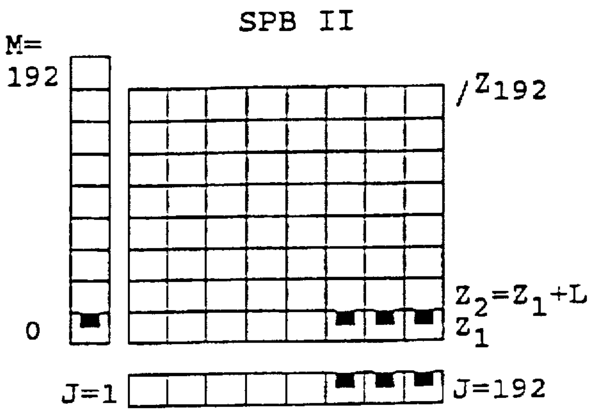
FIG. 5*b* is a diagram of a memory area II after a 90° rotation of the pixel memory field.
Figure 5C:
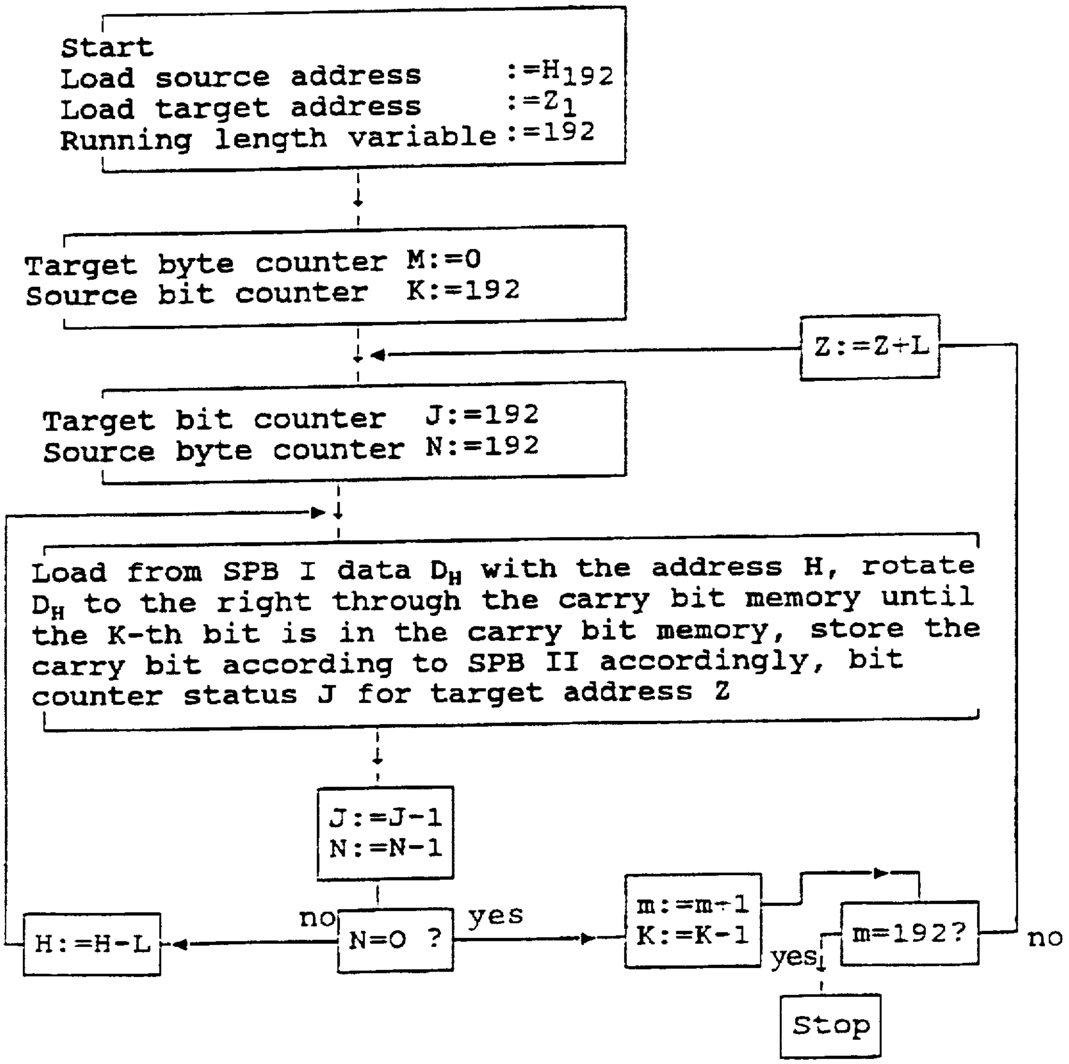
FIG. 5*c* is a flow chart for a 90° rotation of the pixel memory field.

Another variant of a flow chart for a 90° rotation of the pixel memory fields, which is shown in FIG. 5c, is just one example of a solution that can be implemented in terms of software. For the sake of illustration, FIG. 5a shows one memory area or region SPB I (192*192) with the respective source bit counter and source byte counter and FIG. 5b shows a memory area or region SPB II (192*192) with the respective source bit counter and source byte counter. In the pixel memory field that is to be rotated (192*192) an initial position is selected at a source byte N=192 and a source bit K=192. A first source address $H_{192}$ and the first target address $Z_1$ are then loaded for each data word with 192 bits.

Of each data word of the top source address $H_{192}$, only the last 192nd bit is needed. Therefore, the data word is shifted in a shift register to the 192nd bit in a carry bit memory. This carry bit is then loaded as the 192nd bit into the data word to be formed under the target address $Z_1$. The source byte counter and the target bit counter are then decremented to N:=N−1 and J:=J−1. The new second-from-the-top source address is obtained by decrementing by a running length variable L=192 bits to yield H:=H−L.

Likewise, only the last 192nd bit of the data word of the second source address from the top $H_{191}$ is needed. The data word is shifted in the shift register as far as the 192nd bit in a carry bit memory. This carry bit is loaded as the 191st bit into the data word to be formed under the first target address $Z_1$.

This is continued until the last bit of the bottom source address $H_1$ has been transferred as the first bit to the data word of the first target address $Z_1$. Then N=0 is reached by decrements, the target byte counter is increased by increments to M:=M+1 and the source bit counter is decreased decrementally to K:=K−1. As long as the transfer of the last bits has not yet been concluded, the target address is increased incrementally by the running length variable to yield Z:=Z+L. The change in address then takes place because of the decremented source bit counter for the 191st bits of all source addresses. In general, the k-th bits of the data $D_H$ of all source addresses become bits of the data of a target address. When the transfer of the last bit is concluded, the target byte counter stands at M=192. After stopping, the next block can be rotated by 90° in the same way or by a similar method. An orthogonal rotation by 180° or 270° is possible by running through the flow chart several times.

Ink jet printers or thermal transfer printers can be used to advantage in the print unit 1. When using an ETR printer with 192 electrodes in one print strip, thus 192*192 individual data bits called up serially from the memory area I are readdressed. The same procedure is followed in readdressing the other blocks of 192*192 bits (not shown in FIG. 4 for reasons of space). The electronic switch is supplemented by other switches that are linked together in the same manner when another different rotation is to be implemented with other address converters.

Since only one-third of the memory area that must be available for use of the postage meter machine is utilized for each block, this readdressing procedure takes place so rapidly that enough time is available for switching to rotation of the pixel memory field and for serial data transfer to the SP shift register in the switch unit 2. In an advantageous manner, memory areas II to IV concern the same the pixel memory area (RAM) that is also addressed during use of the postage meter machine. Although an addressable RAM area or region of $2^{18}$ bit addresses is needed for memory areas I to IV, this capacity is not fully utilized.

Several variants are possible and a smaller memory area may also be sufficient. In the first variant, data are readdressed and stored temporarily by blocks in the memory area II and then transferred serially to the switch unit after the switch operation has been performed. After this transfer, the readdressing and temporary storage in the third memory area III can be performed. During printout, other data of a block can thus be read, readdressed and stored temporarily. This is also true of the third block while the second block is being printed out, etc. The memory area II that is printed out in the meantime is then free again for the data of a new block. In a second variant, first all three memory areas II, III and IV are filled with data before the printout takes place. For $2^{18}$ bits of addressable RAM area, up to 7 pixel memory areas of 192*192 bits can be addressed. It is clear in this case that when several memory areas are available, there are several possible means of operation in order to generate an internal cost center printout and all of them make use of the solution according to the invention.

This invention is not limited to the present embodiment. Instead, a number of different variants which would make use of the solution presented herein even though the embodiments are fundamentally different in implementation, would also be conceivable.

We claim:

1. A postage meter module having a configuration for an internal cost center printouts, comprising:

- a printing unit for printing postal indicia and cost center printouts;
- a print control unit connected to said printing unit;
- input/output devices connected to said print control unit;
- memory devices connected to said print control unit;
- a pixel memory having a field and at least one memory area for accounting data into which data are loaded and converted and from which data are read out and converted, the conversion being a blockwise orthogonal rotation of the pixel memory field;
- a device for orthogonal rotation of said pixel memory field, to permit a block of a print image with accounting data having been electronically rotated by 90° or by 270° in a direction of printing, to be temporarily stored in or read out from said at least one memory area of said pixel memory;
- said print control unit reading out print image data corresponding to the accounting data by blocks from said pixel memory; and
- said print control unit controlling said printing unit to switch over from printing postage indicia to printing the accounting data in a form of the cost center printouts.

2. The configuration according to claim 1, wherein said device for rotation of said pixel memory field is disposed in one of said print control unit and said control unit, and said device for rotation operates with at least one of hardware and software.

3. The configuration according to claim 2, wherein said pixel memory receives the accounting data from the control unit for display in an output device in the printing direction in the form of a print image by blocks,

- said print control is connected to at least one first area of said pixel memory and to the control unit, and
- said device for orthogonal rotation of said pixel memory field is connected to said pixel memory for reading out a block of a print image with accounting data having been electronically rotated by 90° or by 270° in the direction of printing from said at least one first area of said pixel memory.

4. The configuration according to claim 2, wherein said device for orthogonal rotation of said pixel memory field is connected to said pixel memory for inputting at least one block of a print image with accounting data into at least one second area of said pixel memory having been electronically rotated by 90° or by 270° in the direction of printing, said print control unit is connected to said second area of said pixel memory and to the control unit, and said print control unit receives the accounting data to be displayed in a display device in the printing direction in the form of orthogonally rotated blocks of a print image, during an output of print data.

5. The configuration according to claim 1, wherein said pixel memory contains at least two separate memory areas from which said print control unit reads out print image data according to the accounting data block by block, said pixel memory is connected to the control unit for supplying said pixel memory with the accounting data to be displayed in an output device in the direction of printing in the form of a print image block by block, each block of a print image with accounting data is stored temporarily in said first area of said pixel memory and converted by said device for orthogonal rotation of said pixel memory field and transmitted to at least a second area of said pixel memory for temporarily storing a block of a print image with accounting data rotated electronically by 90° or 270° in the direction of printing in said second area of said pixel memory before printout.

6. The configuration according to claim 1, wherein said device for rotation of said pixel memory field includes at least one electronic switch and a device for generating addresses.

7. The configuration according to claim 1, wherein said electronic switch includes a multiplexer, and said device for generating addresses includes at least one read-only memory for converting the addresses individually.

8. The configuration according to claim 7, including a plurality of tri-state buffers of said multiplexer, a state machine of said print control unit for controlling said multiplexer for reading out the data from said at least one memory area of said pixel memory, a first counter for generating low addresses for internal addressing of the data of each block, and a second counter for generating area addresses for addressing said at least one memory area.

9. A process for an internal cost center printout with a printing device for printing out variable information, which comprises:

switching over operation of a print head of a postage meter from printing postage for postal matter to printing a cost center printout via user inputs received by a control unit of the postage meter;

accessing and compiling accounting data stored in a cost center memory to formulate the cost center printout via the control unit working together with input/output devices;

converting the accounting data into graphics pixels via the control unit and printing the accounting data with the print head of the postage meter to create the cost center printout.

10. The process according to claim 9, which comprises, based on the switchover operation:

after the accessing and compiling steps, entering the accounting data into a working memory, decompressing the accounting data, and processing the accounting data, after the converting step temporarily storing the accounting data by blocks in a pixel memory, placing the accounting data regarding at least one cost center in each block plus either data for the purpose of identification or data totaled up in accordance with selected areas for each of the respective cost centers in which there has been some activity, and generating an address field for the cost center printout and using the print head for printing postage indicia for printing the cost center printout wherein the cost center printout differs from the printing postage indicia.

11. The process according to claim 9, which comprises performing another switchover operation in a print control unit before a print unit of the postage meter module is used for the internal cost center printout, and rotating a print image in the form of blocks orthogonally by blocks, preferably by 90° in the direction of printing, before the printout.

12. The process according to claim 9, which comprises performing another switchover operation in a control unit, and completing an orthogonal rotation of blocks containing information groups in conjunction with other storage areas of working memory according to a program stored in a program memory.

13. The process according to claim 11, which comprises performing the other switchover operation in the control unit by entering data with converted addresses or with unconverted addresses into selected memory areas of the pixel memory and reading out the data with the converted addresses or the unconverted addresses.

14. The process according to claim 10, which comprises temporarily storing the blocks having been rotated orthogonally in different ways, in memory areas of the pixel memory.

15. The process according to claim 10, which comprises placing a number x of information groups in one block, electronically rotating a print image being present in the form of k blocks by blocks in a print direction so that lines become columns and columns become lines, wherein k blocks contain only accounting data on $m_A=y*\{(x*k)-1\}-1$ cost centers, placing an identification in a first information group of at least one first block of one print image, placing a summation showing totals for the accounting data in a last information group of a last block of a print image, and uniformly distributing the information groups on blocks and checking the blocks via a display before being printed.

16. The process according to claim 9, which comprises requesting a second strip from a strip feed and printing the second strip if a first strip is not sufficient to print out all of the cost centers, and identifying the strips with at least a date, a number of the internal cost center printout and a number of an order in which it appears.

17. The process according to claim 9, which comprises executing a user dialogue for authorizing and selecting the contents of the printout and displaying use of the postage meter module for each cost center, before the internal cost center printout.

18. The process according to claim 17, which comprises including in the user dialogue a separate authorization procedure for certain cost centers requiring a higher level of security, and limiting access to this cost center information to only a certain group of people, including in a cost center routine an input request for an area to cost centers, for an order in a sequence of cost center printouts and for an order of a list within a printout for each cost center and forming information groups automatically.

19. The process according to claim 9, which comprises creating a list within a cost center according to optional printouts.

20. A postage meter assembly, comprising:

a postage meter module including a control unit, a printing unit with a postage meter print head, input/output devices connected to said control unit, and memory devices connected to said control unit;

a configuration for printing an internal cost accounting printout with said postage meter module having said postage meter print head, said configuration comprising:

a) a printing unit input device for switching to an internal cost accounting print mode;

b) said control unit connected to said printing unit, said control unit being programmed to:

block a franking function of said postage meter module upon switching to the internal cost accounting print mode;

process a user dialog, to process accounting data for the internal cost accounting printout, and to intermediately store the accounting data for the printout;

c) a print control unit connected to said print head of said postage meter module, said print control unit receiving the accounting data from said control unit, and said print head of said postage meter module printing the internal accounting printout.

21. The configuration according to claim 20, wherein said control unit is programmed to prompt a user of said postage meter module for input, upon switching to the internal cost accounting print.

22. The configuration according to claim 20, wherein said control unit is programmed to selectively display accounting data and to assemble selected accounting data for the cost accounting printout in cooperation with said input/output devices.

23. The configuration according to claim 20, wherein said input device includes a selection device for selecting a predetermined cost center or a predetermined group of cost centers.

24. The configuration according to claim 20, including a pixel memory, said control unit includes an output logic, and said control unit is programmed to transfer print image data from said output logic to said pixel memory, said control unit being connected to said print head of said print module via said print control unit, said print control unit supplying the print data in columns of pixels to said print head, and wherein said print head is not moved while printing said print data.

25. The configuration according to claim 20, including a pixel memory, wherein said control unit is programmed to assemble accounting data, to read into a working memory, to process the accounting data and convert the accounting data into graphic pixels, to intermediately store the pixels in blocks in said pixel memory, and to output the print image data according to the accounting data in blocks from the pixel memory through said print control unit.

26. The configuration according to claim 20, wherein said control unit is programmed to print cost accounting data onto a print medium with said print head of said postage meter module.

27. The configuration according to claim 26, wherein said control unit is programmed to mark the print medium according to a print medium sequence with said print head of said postage meter module.

28. A process for an internal cost center printout with a printing unit of a postage meter module for printing out variable information, which comprises:

switching over operation of a printhead of a postage meter module from printing postage for postal matter to printing a cost center printout;

subsequently driving the printing unit of the postage meter module in internal cost accounting mode, by multiple repetition of a pixel field rotation routine which includes reading data with non-converted addresses into selected memory areas of a pixel memory and reading out the data with converted addresses; and printing the cost accounting printout with the printhead otherwise used for printing postal matter and switching back the printhead of the printing unit to a mode in which postage indicia is printed with the print control unit after the cost center printout is printed.

29. The process according to claim 28, wherein blocks of data are intermediately stored in printing pauses.

30. A process for an internal cost center printout with a printing unit for printing variable information, which comprises:

switching over to a routine for an internal cost center printout and subsequently driving a printhead of a printing unit of a postage meter module to an internal cost center printout mode;

reading in data with non-converted addresses into selected memory areas of a pixel memory of the postage meter module and reading out the data with non-converted addresses; and printing the cost center printout by controlling the postage meter-module printhead with a print control unit; and switching back the printhead of the printing unit to a mode in which postage indicia is printed with the print control unit after the cost center printout is printed.

* * * * *